Sept. 8, 1942.  R. W. SCHNEIDER  2,295,360
HOOK FASTENER FOR DOORS AND THE LIKE
Filed Dec. 14, 1940

Inventor
REUBEN W. SCHNEIDER

By Irving A. McCathran
Attorney

Patented Sept. 8, 1942

2,295,360

UNITED STATES PATENT OFFICE 2,295,360

HOOK FASTENER FOR DOORS AND THE LIKE

Reuben W. Schneider, Alliance, Ohio

Application December 14, 1940, Serial No. 370,197

1 Claim. (Cl. 292—114)

This invention relates to a hook fastener for doors and the like, and has for one of its objects the production of a simple and efficient hook for hooking screen doors and other similar doors, the hook being so constructed as to prevent the hook from accidentally locking the door should the door slam to a closed position.

Another object of this invention is the production of a simple and efficient hook which is provided with an elongated eye which will allow the hook to be placed in an upright position by an operator when unlocking the hook and prevent the hooking end from accidentally moving to a hooking engagement with the locking eye which is adapted to receive the hooking end.

Other objects and advantages of the present invention will appear throughout the following specification and claim.

Figure 1:
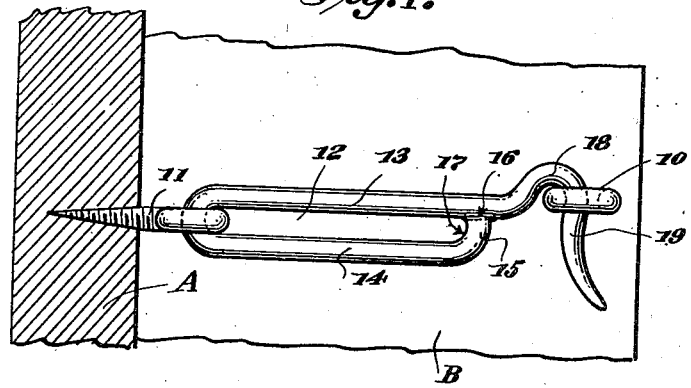
Figure 1 is a side elevational view of the hook in a locked position, the supporting door being shown in vertical section.

By referring to the drawing, it will be seen that A designates a door or other support and B designates a door-jamb or abutment. A locking eye 10 of the conventional type is secured in any suitable or desired manner upon the door-jamb B, and a hook-anchoring eye 11 is secured or threaded into the door A.

My improved hook comprises an elongated eye 12 which is formed from a shank 13 which is bent backwardly upon itself to provide a spaced parallel shank 14, the shank 14 being inwardly bent at its outer end, as at 15, toward the shank 13, and being welded or otherwise secured, as at 16. The outer end 15 provides an abutment shoulder 17. The shank 13 carries the outwardly projecting hooking end 18 which is so mounted as to extend laterally to one side of the shank 13 away from the shank 14, the hooking enclosure 18 having a locking eye-engaging prong 19, as shown in Figure 1.

Figure 2:
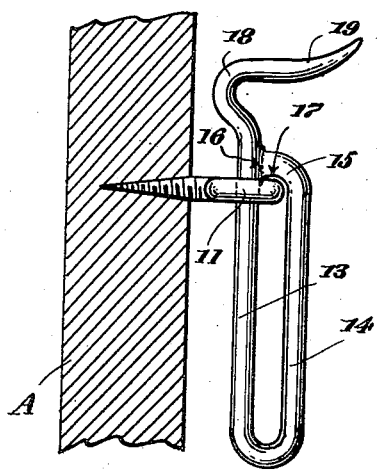
Figure 2 is a side elevational view showing the hook in the unlocked position and the supporting door in section.

The operation of the device is as follows:

The prong 19 is inserted through the locking eye 10 to cause the hooking end 18 to firmly engage the eye 10, the opposite end of the elongated eye 12 being connected to the anchoring eye 11, in this way firmly locking the door A in a closed position upon the door-jamb B. When it is desired to unlock the door, the hooking end 18 is raised above the longitudinal and horizontal axis of the hook to withdraw the prong 19 from the eye 10 and the weight and position of the lower end of the elongated eye 12 will cause the body of the hook to slide downwardly through the anchoring eye 11, moving the body of the hook to an upright position such as is shown in Figure 2, the weight of the eye 12 and the offset or lateral position of the hooking end 18 assisting in holding the body of the hook in this upright position within the eye 11. The abutment shoulder 17 overhangs the eye 11, as shown in Figure 2. Should the door A suddenly slam upon the door-jamb B, the hook will not be likely to swing over to engage the locking eye 10 carried by the jamb B due to the fact that the weight of the elongated eye 12 will be below the center of gravity and also due to the fact that the offset or lateral extension of the hooking end 18 will tend to hold the hook in a vertical position. The hook may be formed of wire or other material and may be circular in cross-section so as to freely slide through the eye 11. It should be understood, however, that the hook may be formed of any suitable material without departing from the spirit of the invention so long as it conforms to the shape shown in the drawing.

It should be understood that a very simple and efficient hook is provided which is so constructed as to prevent the accidental locking of the door due to the accidental swinging of the hook to a locking position. When a door is unlocked from the inside, the hook is raised as stated above, and is allowed to drop downwardly within the anchoring eye 11 from the position shown in Figure 1 to the position shown in Figure 2. As also stated above, most of the weight of the hook will hang below the eye 11 when the hook is in the position shown in Figure 2, thereby tending to hold the hook in this upright position where it cannot become accidentally locked in engagement with the eye 10 on the jamb. When it is desired to hook the door, the hook may be pulled through the eye 11 and moved from an upright to a substantially horizontal position for hooking engagement with the locking eye 10.

Figure 3:
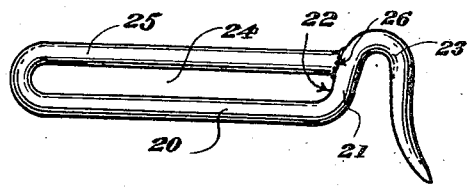
Figure 3 is a side elevational view of a modified form of the hook.

In Figure 3, there is shown a modified form of the invention wherein the body of the hook is formed of a single strand of wire or otherwise formed to conform to the shape shown in the drawing. In this form shown in Figure 3, the body of the hook comprises a shank 20 which is bent laterally, as at 21, to provide an abutment shoulder 22 and this laterally bent portion 21 of the shank 20 is bent to form a hooking end 23. The opposite end of the shank 20 is bent backwardly upon itself to provide an elongated eye or link 24 through the medium of the spaced shank 25, which spaced shank 25 is welded or otherwise secured to the hooking end 23, as at 26, adjacent the abutment shoulder 22.

It should be understood that certain detail changes in the construction of the device may be employed without departing from the spirit of the invention, so long as such changes fall within the scope of the appended claim.

Having described the invention, what I claim as new is:

In combination with an anchoring eye, a fastener formed from a single length of metal bent intermediate its ends to provide spaced shanks defining an elongated slot, one shank terminating in a hook and the other shank being offset laterally with respect to the first mentioned shank and terminating in an inwardly turned laterally disposed shoulder having its terminal connected with the adjacent shank at a point beyond the transverse central axis of the shanks, whereby the hook will be held in its uppermost position when the shoulder is engaged with the anchoring eye and the fastener is in a vertical position.

REUBEN W. SCHNEIDER.